(12) United States Patent
Kim et al.

(10) Patent No.: US 10,019,088 B2
(45) Date of Patent: Jul. 10, 2018

(54) DISPLAY DEVICE WITH AN INTEGRATED TOUCH SENSOR AND METHOD OF DRIVING THE SAME

(71) Applicant: LG DISPLAY CO., LTD., Seoul (KR)

(72) Inventors: Hui Kim, Seoul (KR); Kiltae Kim, Paju-si (KR); Sunyeop Kim, Seoul (KR); Hyunsuk Cho, Gwangmyeong-si (KR)

(73) Assignee: LG DISPLAY CO., LTD., Seoul (KR)

( * ) Notice: Subject to any disclaimer, the term of this patent is extended or adjusted under 35 U.S.C. 154(b) by 212 days.

(21) Appl. No.: 14/983,071

(22) Filed: Dec. 29, 2015

(65) Prior Publication Data

US 2017/0090629 A1 Mar. 30, 2017

(30) Foreign Application Priority Data

Sep. 30, 2015 (KR) .................. 10-2015-0138262

(51) Int. Cl.
*G06F 3/041* (2006.01)
*G09G 3/20* (2006.01)

(52) U.S. Cl.
CPC .......... *G06F 3/0412* (2013.01); *G06F 3/0418* (2013.01); *G09G 3/2092* (2013.01); *G06F 2203/04107* (2013.01); *G09G 3/20* (2013.01); *G09G 2310/0275* (2013.01); *G09G 2310/0289* (2013.01); *G09G 2310/0291* (2013.01); *G09G 2320/0209* (2013.01); *G09G 2330/00* (2013.01)

(58) Field of Classification Search
CPC combination set(s) only.
See application file for complete search history.

(56) References Cited

U.S. PATENT DOCUMENTS

| | | | |
|---|---|---|---|
| 2014/0210771 A1 | 7/2014 | Kim et al. | |
| 2015/0002485 A1* | 1/2015 | Case | G06F 3/04883 345/179 |
| 2015/0355767 A1* | 12/2015 | Abe | G06F 3/0412 345/174 |

FOREIGN PATENT DOCUMENTS

| KR | 10-2014-0079689 A | 6/2014 |
|---|---|---|
| TW | 434257 U | 7/2012 |
| TW | 201419071 A | 5/2014 |
| TW | 201530393 A | 8/2015 |

* cited by examiner

*Primary Examiner* — Robin Mishler
(74) *Attorney, Agent, or Firm* — Dentons US LLP

(57) ABSTRACT

A display device includes a display panel including an active area, in which pixels for displaying an input image and touch sensors for sensing a touch input are located, and a bezel area outside the active area and a power integrated circuit (IC) configured to produce DC (direct current) power and AC (alternating current) power and supply the DC power and the AC power to power lines disposed in the bezel area. The power lines include a first power line, to which the DC power is supplied, and a second power line, to which the AC power is supplied. The bezel area includes a first bezel area, in which the first power line is located, and a second bezel area, in which the second power line is located.

7 Claims, 13 Drawing Sheets

DISPLAY DEVICE WITH AN INTEGRATED TOUCH SENSOR AND METHOD OF DRIVING THE SAME

CROSS REFERENCE TO RELATED APPLICATIONS

This application claims the benefit of Korea Patent Application No. 10-2015-0138262 filed on Sep. 30, 2015, which is incorporated by reference for all purposes as if fully set forth herein.

BACKGROUND

Field of the Disclosure

The present disclosure relates to a display device, in which touch sensors are embedded in a pixel array.

Discussion of the Related Art

User interface (UI) is configured so that users are able to communicate with various electronic devices, and thus, can easily and comfortably control the electronic devices as they desire. Examples of a user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

The touch UI has been essentially adopted in portable information devices, such as smart phones, and expanded to notebook computers, computer monitors, and home appliances. A technology (hereinafter referred to as "in-cell touch sensor technology") has been recently proposed to embed touch sensors in a pixel array of a display panel. In the in-cell touch sensor technology, the touch sensors may be fabricated in the display panel without an increase in a thickness of the display panel. The touch sensors are connected to pixels through parasitic capacitances. In order to reduce a mutual influence attributable to coupling between the pixels and the touch sensors, one frame period may be time-divided into a period (hereinafter referred to as "display driving period"), in which the pixels are driven, and a period (hereinafter referred to as a "touch sensor driving period"), in which the touch sensors are driven.

In the in-cell touch sensor technology, electrodes connected to the pixels of the display panel are used as electrodes of the touch sensors. For example, in the in-cell touch sensor technology, a common electrode supplying a common voltage to pixels of a liquid crystal display is segmented, and segmented common electrode patterns are used as the electrodes of the touch sensors.

A parasitic capacitance connected to the in-cell touch sensors increases due to coupling between the in-cell touch sensors and the pixels. If the parasitic capacitance increases, touch sensitivity and accuracy of touch recognition may be deteriorated. A load free driving method is used to reduce an influence of the parasitic capacitance on the touch sensing.

The load free driving method supplies an AC (alternating current) signal having the same phase and the same amplitude as a touch driving signal to data lines and gate lines of the display panel during the touch sensor driving period, thereby reducing the influence of the parasitic capacitance between the touch sensors and the pixels on the touch sensing. More specifically, the load free driving method supplies a data voltage of an input image to the data lines and also supplies a gate pulse synchronized with the data voltage to the gate lines during the display driving period, and supplies the AC signal synchronized with the touch driving signal to the data lines and the gate lines during the touch sensor driving period.

In the load free driving method, because the touch driving signal and the AC signal having the same phase and the same amplitude are applied to both ends (the touch sensor and the signal lines) of the parasitic capacitance, the influence of the parasitic capacitance may be excluded. This is because voltages at both ends of the parasitic capacitance simultaneously change, and an amount of charges charged to the parasitic capacitance decreases as a voltage difference between both ends of the parasitic capacitance decreases. According to the load free driving method, an amount of charges charged to the parasitic capacitance is theoretically zero. Therefore, a load free effect recognized as if there is no parasitic capacitance may be obtained.

The load free effect may be obtained when the touch driving signal and the AC signal have completely the same phase and the same amplitude. However, a ripple is generated in the adjacent signal lines by the touch driving signal and the AC signal supplied to the signal lines during the touch sensor driving period.

The load free effect is reduced due to a noise resulting from the ripple generated by the touch driving signal and the AC signal.

SUMMARY

The present disclosure describes a display device capable of preventing crosstalk resulting from coupling between first and second power lines and capable of increasing a load free effect. This is accomplished by separating first power lines receiving DC power from second power lines receiving AC power.

In one aspect, there is a display device comprising a display panel including an active area, in which pixels for displaying an input image and touch sensors for sensing a touch input are located, and a bezel area outside the active area and a power integrated circuit (IC) to produce DC (direct current) power and AC (alternating current) power and supply the DC power and the AC power to a plurality of power lines in the bezel area, wherein the plurality of power lines include a first power line, to which the DC power is supplied, and a second power line, to which the AC power is supplied, wherein the bezel area includes a first bezel area, in which the first power line is located, and a second bezel area, in which the at least one second power line is located.

The second bezel area is between the first bezel area and the active area.

A noise blocking line surrounding the active area is in the second bezel area.

A floating line is between the first bezel area and the second bezel area.

During a touch sensor driving period, in which the touch input is sensed, a touch driving signal is supplied to the touch sensors, a first AC signal having the same phase and the same amplitude as the touch driving signal is supplied to data lines connected to the pixels, and a second AC signal having the same phase and the same amplitude as the touch driving signal is supplied to gate lines connected to the pixels. One of the touch driving signal, the first AC signal, and the second AC signal is supplied to the second power line.

During a touch sensor driving period, in which the touch input is sensed, a touch driving signal is supplied to the touch sensors, a first AC signal having the same phase and the same amplitude as the touch driving signal is supplied to data lines connected to the pixels, and a second AC signal having the same phase and the same amplitude as the touch driving signal is supplied to gate lines connected to the pixels. One of the touch driving signal, the first AC signal, and the second AC signal is supplied to the noise blocking line.

A width of the noise blocking line is greater than a width of the first power lines or a width of the second power line.

A width of the floating line is greater than a width of the first power lines or a width of the second power line.

In another aspect, a method of driving a touch sensor integrated into a display panel, comprises dividing a frame period into a display period and a touch sensing period; supplying a first alternating current (AC) signal to a pixel data line and a second AC signal to a pixel gate line during the touch sensor driving period; supplying a touch driving signal to the touch sensor during the touch sensor driving period; and supplying a data voltage to the data line and a gate pulse synchronized with the data voltage to the gate line and stopping the first and the second AC signals during the display driving period; wherein the first and the second AC signals are synchronized with the touch sensor driving signal, and wherein the first and the second AC signals are a same amplitude as the touch sensor driving signal.

The method may also include supplying a common voltage to the touch sensor during the display driving period.

The method may also include generating a first pulse-width modulated (PWM) signal, a second PWM signal, and a third PWM signal, wherein the touch driving signal is based on the first PWM, the first AC signal is based on the second PWM signal, and the second AC signal is based on the third PWM signal.

The present disclosure can prevent the crosstalk resulting from the coupling between the first and second power lines by separating the first power lines receiving the DC power from the second power lines receiving the AC power. As a result, the load free effect can increase.

The present disclosure supplies one of the touch driving signal, the first AC signal, and the second AC signal to the noise blocking line surrounding the active area and thus can block a noise resulting from a fringe capacitance generated due to the power lines positioned in the bezel area outside the active area. As a result, a touch performance at an edge of the active area adjacent to the bezel area can be improved.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1:
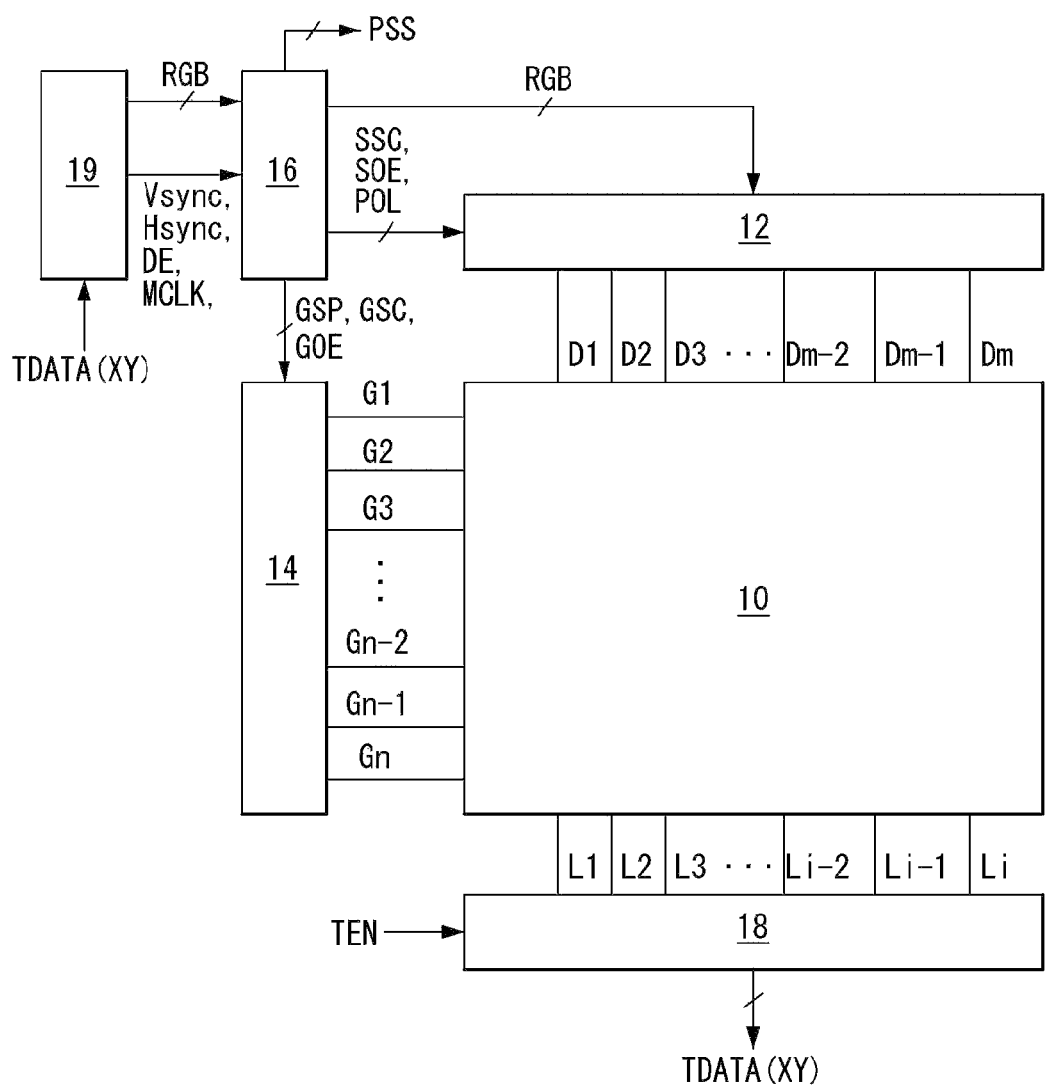
FIG. 1 illustrates a display device according to an exemplary embodiment of the invention.

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

FIGS. 1 to 6 illustrate a display device according to an exemplary embodiment of the invention.

Referring to FIGS. 1 to 6, a display device according to the embodiment of the invention may be implemented based on a flat panel display, such as a liquid crystal display (LCD), a field emission display (FED), a plasma display panel (PDP), an organic light emitting diode display, and an electrophoresis display (EPD). In the following description, the embodiment of the invention will be described using the liquid crystal display as an example of the flat panel display. Other flat panel displays may be used.

The display device includes a display module and a touch module.

The display module may include a display panel 10, a display driver, a timing controller 16, and a host system 19.

The display panel 10 includes a liquid crystal layer formed between an upper substrate and a lower substrate. A pixel array of the display panel 10 includes pixels 101 formed in pixel areas defined by data lines D1 to Dm and gate lines G1 to Gn, where m and n are a positive integer. Each pixel 101 includes thin film transistors (TFTs) formed at crossings of the data lines D1 to Dm and the gate lines G1 to Gn, a pixel electrode charged to a data voltage, a storage capacitor which is connected to the pixel electrode and holds a voltage of the pixel, and the like.

The display panel 10 includes an active area, in which the pixels 101 for displaying an input image and touch sensors TS for sensing a touch input are positioned, and a bezel area positioned outside the active area.

Black matrixes, color filters, etc. may be formed on the upper substrate of the display panel 10. Alternatively, the lower substrate of the display panel 10 may be configured in a COT (color filter on TFT) structure. In this instance, the black matrixes and the color filters may be formed on the lower substrate of the display panel 10. A common electrode, to which the common voltage Vcom is supplied, may be formed on the upper substrate or the lower substrate of the display panel 10. Polarizing plates are respectively attached to the upper substrate and the lower substrate of the display panel 10. Alignment layers for setting a pre-tilt angle of liquid crystals are respectively formed on the inner surfaces contacting the liquid crystals in the upper substrate and the lower substrate of the display panel 10. A column spacer is formed between the upper substrate and the lower substrate of the display panel 10 to keep cell gaps of the liquid crystal cells constant.

A backlight unit may be under a back surface of the display panel 10. The backlight unit may be implemented as one of an edge type backlight unit and a direct type backlight unit and irradiates light onto the display panel 10. The display panel 10 may be implemented in any known mode including a twisted nematic (TN) mode, a vertical alignment (VA) mode, an in-plane switching (IPS) mode, a fringe field switching (FFS) mode, etc.

The display driver includes a data driver 12 and a gate driver 14. The display driver applies input image data RGB to the pixels 101 of the display panel 10 under the control of the timing controller TCON 16. The data driver 12 converts the input image data RGB received from the timing controller 16 into positive and negative analog gamma compensation voltages and outputs a data voltage. The data driver 12 then supplies the data voltage to the data lines D1 to Dm. The gate driver 14 sequentially supplies a gate pulse (or a scan pulse) synchronized with the data voltage to the gate lines G1 to Gn and selects pixel lines of the display panel 10 to which the data voltage is applied.

The timing controller 16 receives timing signals, such as a vertical sync signal Vsync, a horizontal sync signal Hsync, a data enable signal DE, and a main clock MCLK, from the host system 19. The timing controller 16 synchronizes operation timings of the data driver 12 and the gate driver 14 with each other. The timing controller 16 generates a data timing control signal and a scan timing control signal for respectively controlling the operation timings of the data driver 12 and the gate driver 14 using the timing signals. The data timing control signal includes a source sampling clock SSC, a source output enable signal SOE, a polarity control signal POL, etc. The scan timing control signal includes a gate start pulse GSP, a gate shift clock GSC, a gate output enable signal GOE, and the like.

The host system 19 transmits the input image data RGB and the timing signals Vsync, Hsync, DE, and MCLK to the timing controller 16. Further, the host system 19 may execute an application associated with touch coordinate information TDATA(XY) received from a touch driving device 18.

The touch module includes touch sensors TS1 to TS4 and the touch driving device 18 driving the touch sensors TS1 to TS4.

The touch sensors TS1 to TS4 may be implemented as capacitive sensors sensing a touch input through a capacitive manner. The touch sensors TS1 to TS4 each have a capacitance. The capacitance may be divided into a self-capacitance and a mutual capacitance. The self-capacitance may be formed along a conductor line of a single layer formed in one direction, and the mutual capacitance may be formed between two conductor lines perpendicular to each other.

Figure 2:
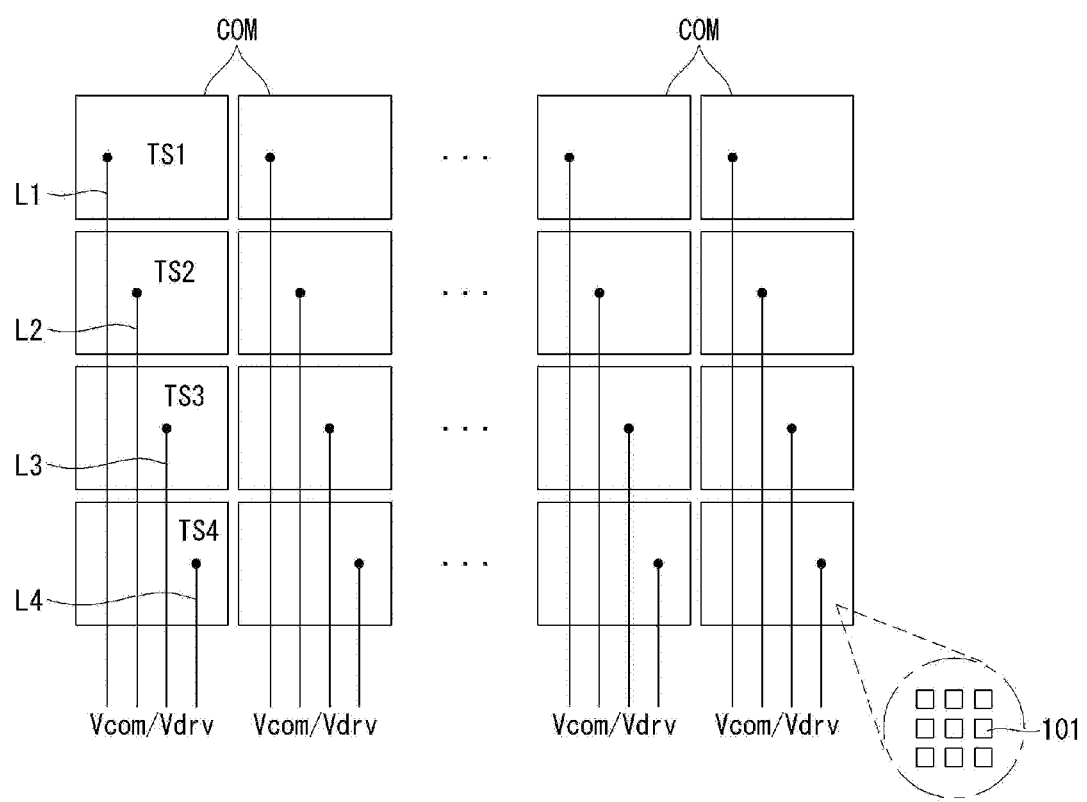
FIG. 2 illustrates an example of a touch sensor embedded in a pixel array.

The touch sensors TS1 to TS4 may be embedded in the pixel array of the display panel 10. Referring to FIG. 2, the pixel array of the display panel 10 includes the touch sensors TS1 to TS4 and sensor lines L1 to Li connected to the touch sensors TS1 to TS4, where "i" is a positive integer less than m and n. A common electrode COM of the pixels 101 is divided into a plurality of segments. The touch sensors TS1 to TS4 are implemented as the divided common electrodes COM. One common electrode segment is commonly connected to the plurality of pixels 101 and forms one touch sensor. The touch sensors TS1 to TS4 supply a common voltage Vcom to the pixels 101 during a display driving period Td. During a touch sensor driving period Tt, the touch sensors TS1 to TS4 receive a touch driving signal Vdrv and sense a touch input. FIG. 2 shows the self-capacitance touch sensors, as an example. Other types of touch sensors may be used for the touch sensors TS1 to TS4.

The touch driving device 18 senses a change in charges of the touch sensors TS1 to TS4 before and after a touch operation and determines whether or not the touch operation using a conductive material, for example, a finger (or a stylus pen) is performed and a location of the touch operation. The touch driving device 18 analyzes the change in the charges of the touch sensors TS1 to TS4, determines whether or not the touch input is received, and calculates coordinates of a location of the touch input. The coordinate information TDATA(XY) of the location of the touch input is transmitted to the host system 19.

Figure 3:
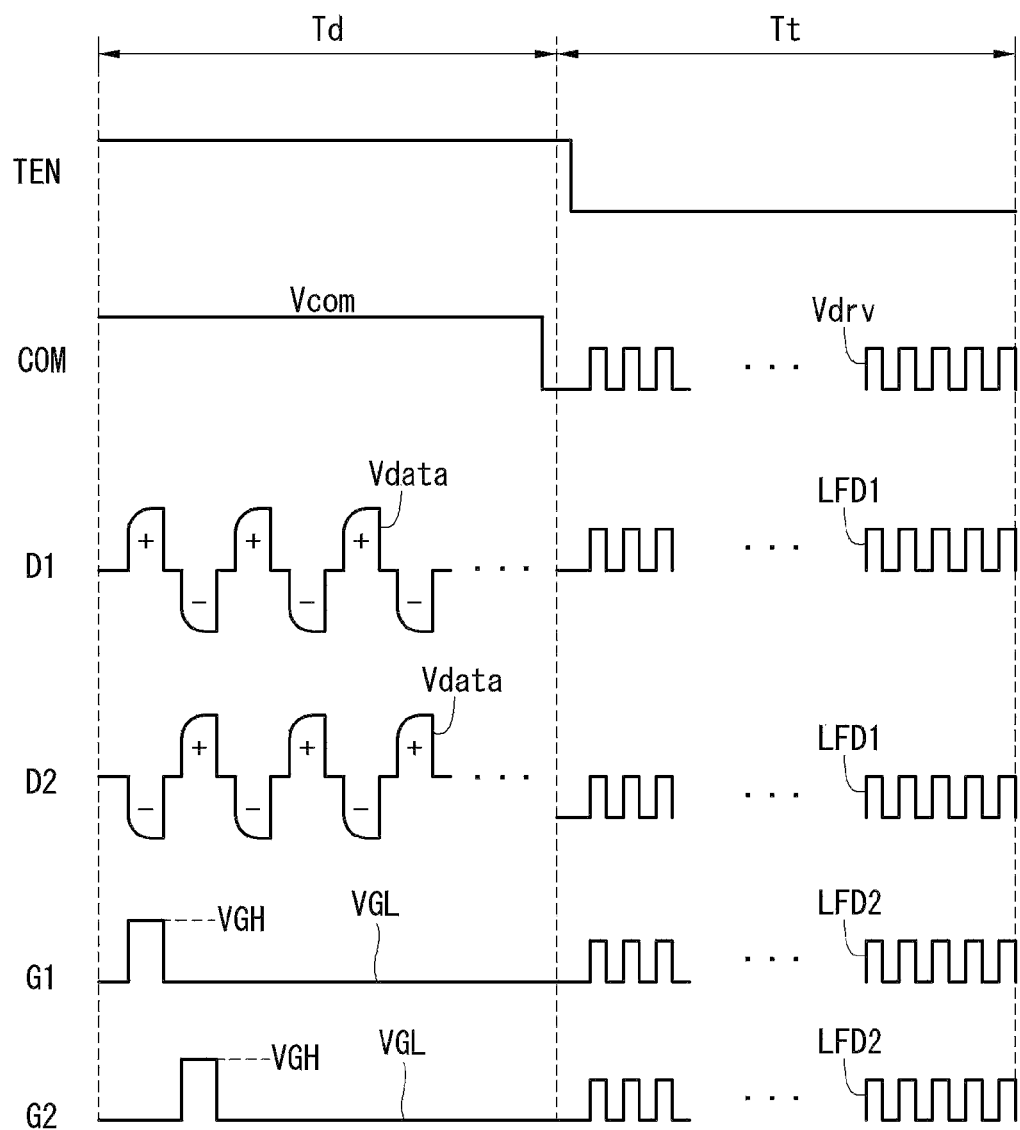
FIG. 3 is a waveform diagram showing signals supplied to a touch sensor, a data line, and a gate line in a display driving period and a touch sensor driving period in a time-division drive according to an exemplary embodiment of the invention.

The display device according to the embodiment of the invention time-divides one frame period into periods, one in which a touch input is sensed, and one in which input image data is applied. For this, as illustrated in FIG. 3, the timing controller 16 may time-divide one frame period into a touch sensor driving period Tt, in which the touch input is sensed, and a display driving period Td, in which the input image data is applied, based on a touch enable signal TEN. FIG. 3 illustrates that one frame period is time-divided into one touch sensor driving period Tt and one display driving period Td, as an example. The embodiment of the invention is not limited thereto. For example, one frame period may be time-divided into more than one touch sensor driving period Tt and more than one display driving period Td.

During the display driving period Td, the data driver 12 supplies the data voltage to the data lines D1 to Dm under the control of the timing controller 16, and the gate driver 14 sequentially supplies the gate pulse synchronized with the data voltage to the gate lines G1 to Gn under the control of the timing controller 16. During the display driving period Td, the touch driving device 18 stops touch sensing operation.

During the touch sensor driving period Tt, the touch driving device 18 drives the touch sensors TS1 to TS4. The touch driving device 18 supplies the touch driving signal Vdrv to the touch sensors TS1 to TS4 through the sensor lines L1 to Li and senses a touch input.

During the touch sensor driving period Tt, the display driver (12, 14) supplies first and second AC (alternating current) signals LFD1 and LFD2 synchronized with the touch driving signal Vdrv to the signal lines D1 to Dm and G1 to Gn connected to the pixels 101, thereby minimizing parasitic capacitances between the signal lines D1 to Dm and G1 to Gn connected to the pixels 101 and the touch sensors TS1 to TS4.

As illustrated in FIG. 3, a touch sensor driver RIC supplies the touch driving signal Vdrv to the touch sensors TS1 to TS during the touch sensor driving period Tt. The display driver (12, 14) supplies the first AC signal LFD1 to the data lines D1 to Dm and supplies the second AC signal LFD2 to the gate lines G1 to Gn during the touch sensor driving period Tt. Namely, during the touch sensor driving period Tt for sensing the touch input, the touch sensor driver RIC supplies the touch driving signal Vdrv to the touch sensors TS1 to TS, supplies the first AC signal LFD1 having the same phase and the same amplitude as the touch driving signal Vdrv to the data lines D1 to Dm connected to the pixels 101, and supplies the second AC signal LFD2 having the same phase and the same amplitude as the touch driving signal Vdrv to the gate lines G1 to Gn connected to the pixels 101.

Figure 5:
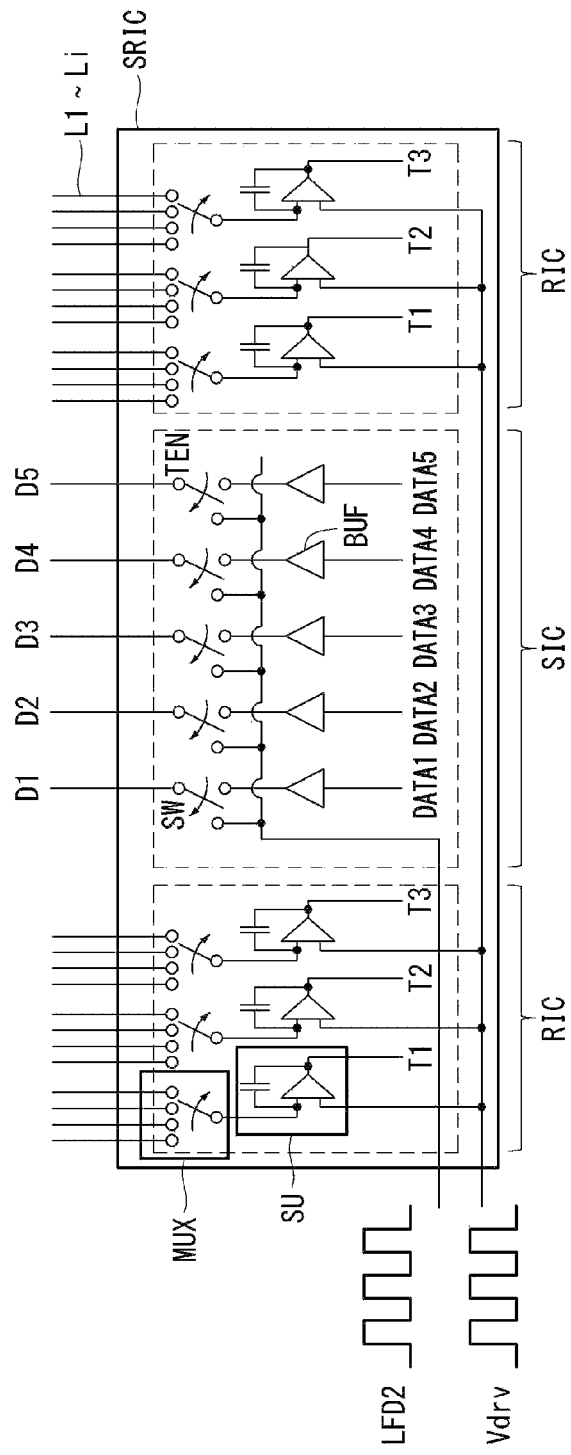
FIG. 5 illustrates internal configuration of SRIC illustrated in FIG. 4.

Referring to FIG. 5, the touch sensor driver RIC may include a multiplexer MUX and a sensing circuit SU. Although not shown, the multiplexer MUX selects touch sensors TS accessed by the sensing circuit SU under the control of a microcontroller unit (MCU) and then supplies the touch driving signal Vdrv to the selected touch sensors TS.

The sensing circuit SU is connected to the sensor lines L1 to Li through the multiplexer MUX, measures a change in a waveform of a voltage received from the touch sensors TS, and converts the change into digital data. The sensing circuit SU includes an amplifier amplifying the received voltages of the touch sensors TS, an integrator accumulating the amplified voltages of the amplifier, and an analog-to-digital converter (ADC) converting a voltage of the integrator into digital data. The digital data output from the ADC is touch raw data and is transmitted to the MCU.

Figure 4:
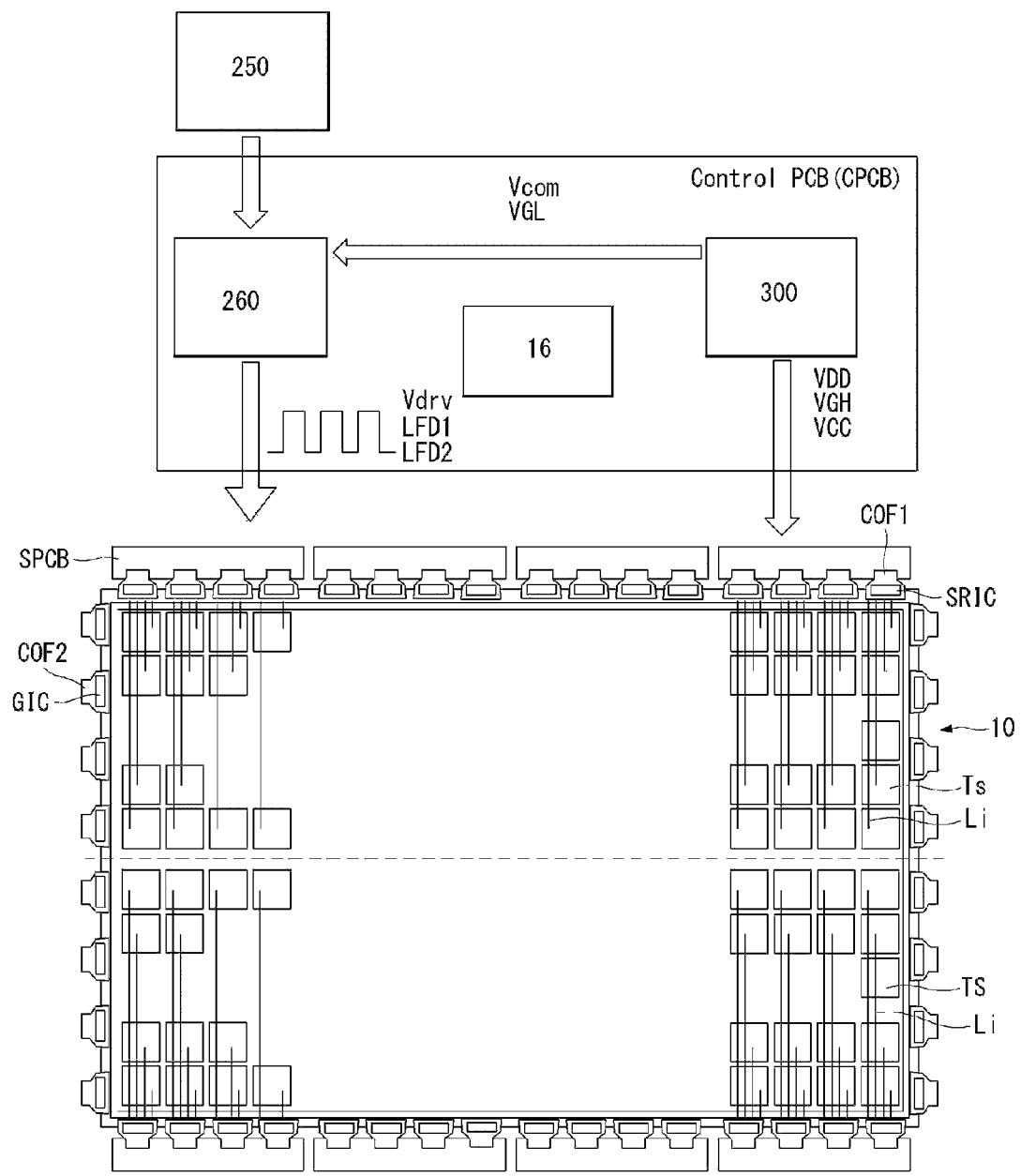
FIG. 4 illustrates a connection relationship of a display panel, a timing controller, a touch driving device, and a display driver according to an exemplary embodiment of the invention.
Figure 6:
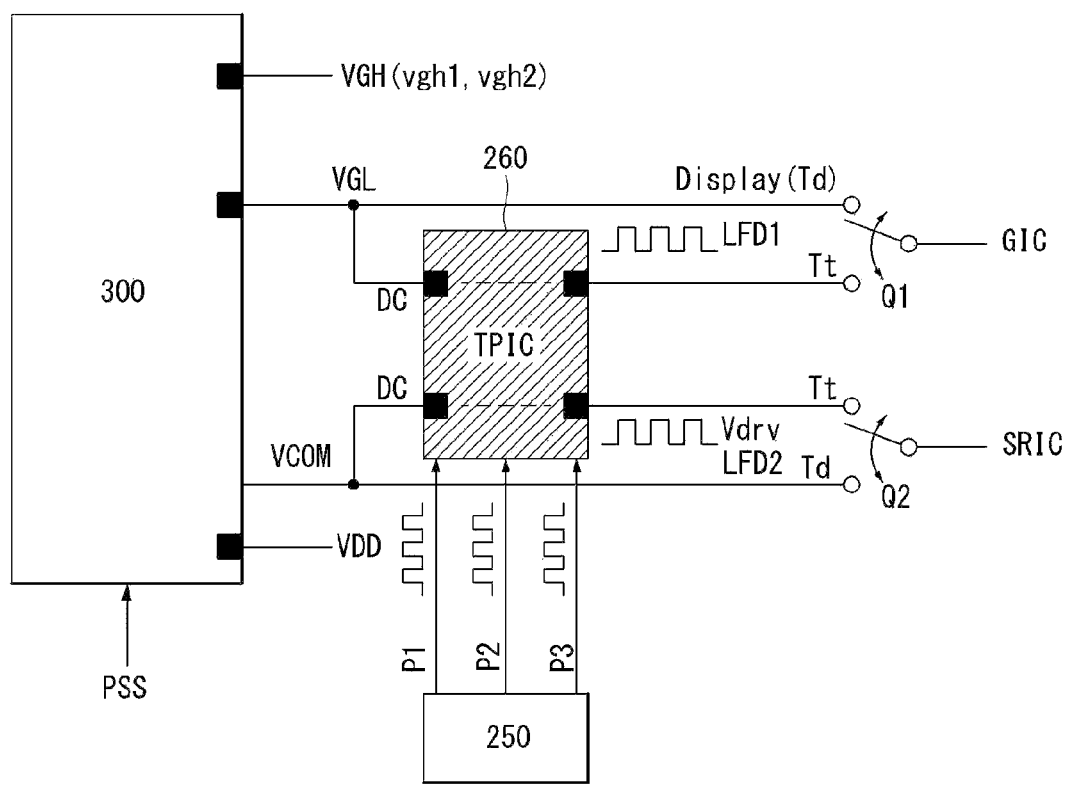
FIG. 6 illustrates an operation of each of a main power IC, TPIC, and a PWM generator according to an exemplary embodiment of the invention.

FIG. 4 illustrates a connection relationship of the display panel, the timing controller 16, the touch driving device, and the display driver. FIG. 5 illustrates internal configuration of the integrated source driver IC and the touch sensor driver SRIC illustrated in FIG. 4. FIG. 6 illustrates an operation of each of a main power IC, touch power IC TPIC, and a pulse width modulation PWM generator according to the embodiment of the invention.

Referring to FIGS. 4 to 6, the touch driving device may include the timing controller TCON 16 mounted on a control printed circuit board (PCB) CPCB, a touch power IC TPIC 260, and a main power IC PMIC 300. The touch driving device may further include a PWM generator 250. The PWM generator 250 may be mounted on the control PCB CPCB.

The control PCB CPCB may be electrically connected to a source PCB SPCB through a cable. The source PCB SPCB and the display panel may be electrically connected to each other through a COF (chip-on film) 1.

A source driver IC SIC implementing the data driver and the touch sensor driver RIC are integrated to form the SRIC. The SRIC may be mounted on the COF1.

A gate driver IC GIC implementing the gate driver may be mounted on a COF2. The COF2 is attached to the display panel.

The touch sensor driver RIC includes the multiplexer MUX and the sensing circuit SU. During the touch sensor driving period Tt, the touch sensor driver RIC supplies the touch driving signal Vdrv received from the touch power IC 260 to the selected touch sensors TS, accumulates charges received from the selected touch sensors TS, and outputs touch raw data T1 to T3. During the display driving period Td, the connection between the sensor lines L1 to Li and the multiplexer MUX is released, and the sensor lines L1 to Li are connected to a common voltage input terminal (not shown). Thus, the common voltage is supplied to the touch sensors TS during the display driving period Td.

The source driver IC SIC includes output control switches SW, which are turned on or off in response to the touch enable signal TEN. During the touch sensor driving period Tt, the output control switches SW connect the touch power IC 260 outputting the first AC signal LFD1 to the data lines D1 to D5 and cause the first AC signal LFD1 to be supplied to the data lines D1 to D5.

During the display driving period Td, the output control switches SW connect output buffers BUF outputting data voltages DATA1 to DATA5 to the data lines D1 to D5 and cause the data voltages DATA1 to DATA5 to be supplied to the data lines D1 to D5.

During the touch sensor driving period Tt, the gate driver IC GIC connects the touch power IC 260 outputting the second AC signal LFD2 to the gate lines G1 to Gn and causes the second AC signal LFD2 to be supplied to the gate lines G1 to Gn.

The gate driver IC GIC and the touch power IC 260 are connected to each other through the COF1, power lines, the COF2, etc. The power lines may be represented as LOG (line-on glass) lines and are signal lines on a display substrate of the display panel. The power lines are described later with reference to FIG. 7. The electrical connection between the gate driver IC GIC and the touch power IC 260 is released during the display driving period Td.

The PWM generator 250 outputs a first PWM signal P1, a second PWM signal P2, and a third PWM signal P3 each having the same phase.

The touch power IC 260 produces the touch driving signal Vdrv based on the first PWM signal P1, the first AC signal LFD1 based on the second PWM signal P2, and the second AC signal LFD2 based on the third PWM signal P3.

As illustrated in FIG. 6, the touch power IC 260 receives a gate low voltage VGL of a DC (direct current) level and the common voltage Vcom from the main power IC 300. The gate low voltage VGL is a voltage capable of turning off the TFTs included in the display panel 10. The touch power IC 260 level-shifts the first PWM signal P1 received from the PWM generator 250 based on the common voltage Vcom and produces the touch driving signal Vdrv. The touch power IC 260 level-shifts the second PWM signal P2 received from the PWM generator 250 based on the common voltage Vcom and produces the first AC signal LFD1. The touch power IC 260 level-shifts the third PWM signal P3 received from the PWM generator 250 based on the gate low voltage VGL and produces the second AC signal LFD2. The touch power IC 260 causes the touch driving signal Vdrv, the first AC signal LFD1, and the second AC signal LFD2 to have the same amplitude.

The main power IC 300 produces a gate high voltage VGH, the gate low voltage VGL, the common voltage Vcom, a high potential driving voltage VDD, a high potential logic voltage VCC, and the like. The gate high voltage VGH is a voltage capable of turning on the TFTs included in the display panel 10. The gate high voltage VGH and the gate low voltage VGL are voltages for producing the gate pulse applied to the gate lines. The high potential driving voltage VDD is a power voltage supplied to a gamma string included in the source driver IC SIC. The high potential logic voltage VCC is an operating voltage for operating internal logics of the source driver IC SIC, the SRIC, and the gate driver IC GIC.

The display device according to the embodiment of the invention is a touch sensor integrated type display device. The touch sensor integrated type display device may adopt a double feeding method illustrated in FIG. 4, so as to minimize a signal distortion attributable to an RC delay. According to the double feeding method, the data voltage is simultaneously supplied to the data lines D1 to Dm from first and second sides of the display panel 10 which are opposite to each other, and the gate pulse is simultaneously supplied to the gate lines G1 to Gn from third and fourth sides of the display panel 10 which are also opposite to each other. The embodiment of the invention is not limited thereto.

Figure 7:
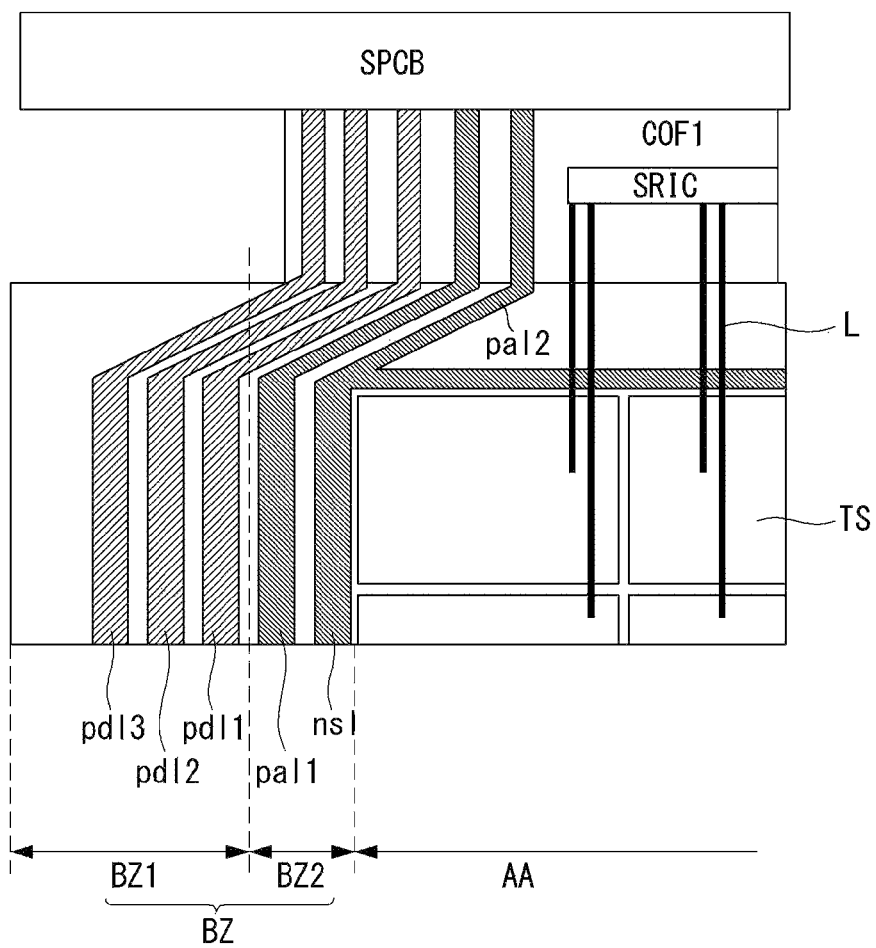
FIG. 7 illustrates a connection relationship of power lines in a bezel area according to an exemplary embodiment of the invention.
Figure 8:
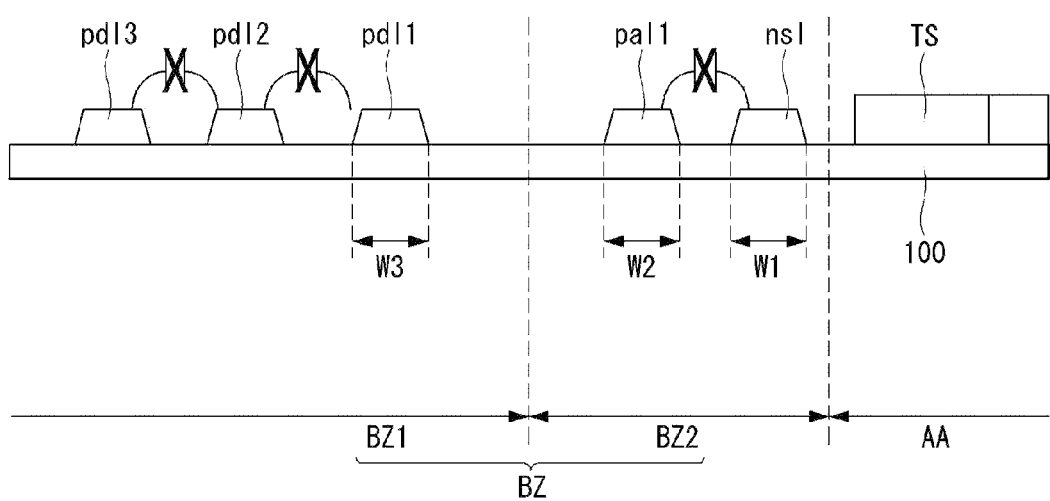
FIG. 8 is a cross-sectional view of power lines in a bezel area illustrated in FIG. 7.

FIG. 7 illustrates a connection relationship of power lines in a bezel area according to the embodiment of the invention, and FIG. 8 is a cross-sectional view of the power lines in the bezel area illustrated in FIG. 7.

Referring to FIGS. 7 and 8, the display panel 10 according to the embodiment of the invention includes an active area AA and a bezel area BZ.

The active area AA includes the pixels 101 for displaying the input image and the touch sensors TS for sensing the touch input.

The bezel area BZ is positioned outside the active area AA. A plurality of power lines pdl and pal are positioned in the bezel area BZ. The power lines pdl and pal receive the DC power and the AC power produced in a power IC. The power lines pdl and pal include first power lines pdl1, pdl2, and pdl3, to which the DC power is supplied, and second power lines pal1 and pal2, to which the AC power is supplied.

The bezel area BZ includes a first bezel area BZ1, in which the first power lines pdl1, pdl2, and pdl3 are disposed, and a second bezel area BZ2, in which the second power lines pal1 and pal2 are disposed. The second bezel area BZ2 is positioned between the first bezel area BZ1 and the active area AA. The second bezel area BZ2 is positioned closer to the active area AA than the first bezel area BZ1.

A noise blocking line nsl surrounding the active area AA may be in the second bezel area BZ2. The noise blocking line nsl may be between the power line pal1 in the second bezel area BZ2 and the active area AA. The noise blocking line nsl may be electrically connected to the power line pal2. The power line pal1 is in the second bezel area BZ2 adjacent to the active area AA, and the first power lines pdl1, pdl2, and pdl3, to which the DC power is supplied, are in the first bezel area BZ1 separated from the power line pal1. Therefore, crosstalk resulting from AC coupling may be prevented.

The power IC includes the main power IC 300 (or PMIC) and the touch power IC 260 (or TPIC). The main power IC 300 produces the gate high voltage VGH, the gate low voltage VGL, the common voltage Vcom, the high potential driving voltage VDD, the high potential logic voltage VCC, and the like. The touch power IC 260 receives the gate low voltage VGL of a DC level and the common voltage Vcom from the main power IC 300 and produces the touch driving signal Vdrv based on the first PWM signal P1, the first AC signal LFD1 based on the second PWM signal P2, and the second AC signal LFD2 based on the third PWM signal P3.

The DC power includes the gate high voltage VGH, the gate low voltage VGL, the common voltage Vcom, the high potential driving voltage VDD, the high potential logic voltage VCC, and the like. The AC power includes the touch driving signal Vdrv, the first AC signal LFD1, and the second AC signal LFD2. During the touch sensor driving period Tt, in which the touch input is sensed, the touch driving signal Vdrv is supplied to the touch sensors TS, the first AC signal LFD1 having the same phase and the same amplitude as the touch driving signal Vdrv is supplied to the data lines D1 to Dm connected to the pixels 101, and the second AC signal LFD2 having the same phase and the same amplitude as the touch driving signal Vdrv is supplied to the gate lines G1 to Gn connected to the pixels 101.

One end of each of the power lines pdl and pal is electrically connected to the COF1, and the other end is electrically connected to COF2. The first power lines pdl1, pdl2, and pdl3 receive the DC power supplied by the touch power IC 260 through the COF1. The first power lines pdl1, pdl2, and pdl3 supply the received DC power to the gate driver IC GIC through the COF2. The second power lines pal1 and pal2 receive the AC power (including the touch driving signal Vdrv, the first AC signal LFD1, and the second AC signal LFD2) supplied by the touch power IC 260 through the COF2. The 21th power line pal1 receives the second AC signal LFD2 and supplies the second AC signal LFD2 to the gate driver IC GIC through the COF2. The 22th power line pal2 receives the AC power (including the touch driving signal Vdrv, the first AC signal LFD1, and the second AC signal LFD2) and supplies the AC power to the noise blocking line nsl.

The first power lines pdl1, pdl2, and pdl3 include the 11th power line pdl1 to which the gate high voltage VGH of the DC level is supplied, the 12th power line pdl2 to which the high potential driving voltage VDD is supplied, and the 13th power line pdl3 to which the high potential logic voltage VCC is supplied. If is preferable, but not required, that the first power line, which is more affected by the crosstalk resulting from the 21th power line pal1 than other first power lines, is far away from the second bezel area BZ2. Hence, the 11th power line pdl1, which is less affected by the crosstalk among the first power lines pdl1, pdl2, and pdl3, may be positioned adjacent to the second bezel area BZ2.

The gate low voltage VGL of the DC level is supplied to the 21th power line pal1 during the display driving period Td, and the second AC signal LFD2 is supplied to the 21th power line pal1 during the touch sensor driving period Tt. The embodiment of the invention describes that the second AC signal LFD2 is supplied to the 21th power line pal1 during the touch sensor driving period Tt, but is not limited thereto. The touch driving signal Vdrv or the first AC signal LFD1 may be supplied to the 21th power line pal1.

One of the touch driving signal Vdrv, the first AC signal LFD1, and the second AC signal LFD2 may be supplied to the noise blocking line nsl disposed between the 21th power line pal1 and the active area AA through the 22th power line pal2.

As described above, the embodiment of the invention supplies one of the touch driving signal Vdrv, the first AC signal LFD1, and the second AC signal LFD2 to the 21th power line pal1 during the touch sensor driving period Tt. The 21th power line pal1 according to the embodiment of the invention is positioned adjacent to the active area AA and is separated from the first power lines pdl1, pdl2, and pdl3, to which the DC power is supplied. Hence, because a mutual capacitance is not produced, a ripple of the DC power supplied to the first power lines pdl1, pdl2, and pdl3 can be prevented.

Further, one of the touch driving signal Vdrv, the first AC signal LFD1, and the second AC signal LFD2 may be supplied to the noise blocking line nsl through the 22th power line pal2. Hence, a noise resulting from a fringe capacitance generated due to the first power lines pdl1, pdl2, and pdl3 positioned in the bezel area BZ outside the active area AA can be blocked. As a result, a touch performance at an edge of the active area AA adjacent to the bezel area BZ can be improved.

A width W1 of the noise blocking line nsl may be greater than a width W3 of the first power lines pdl1, pdl2, and pdl3 or a width W2 of the 21th power line pal1. As the width W1 of the noise blocking line nsl increases, a distortion of the AC signals Vdrv, LFD1, and LFD2 resulting from RC delay can be minimized.

Figure 9:
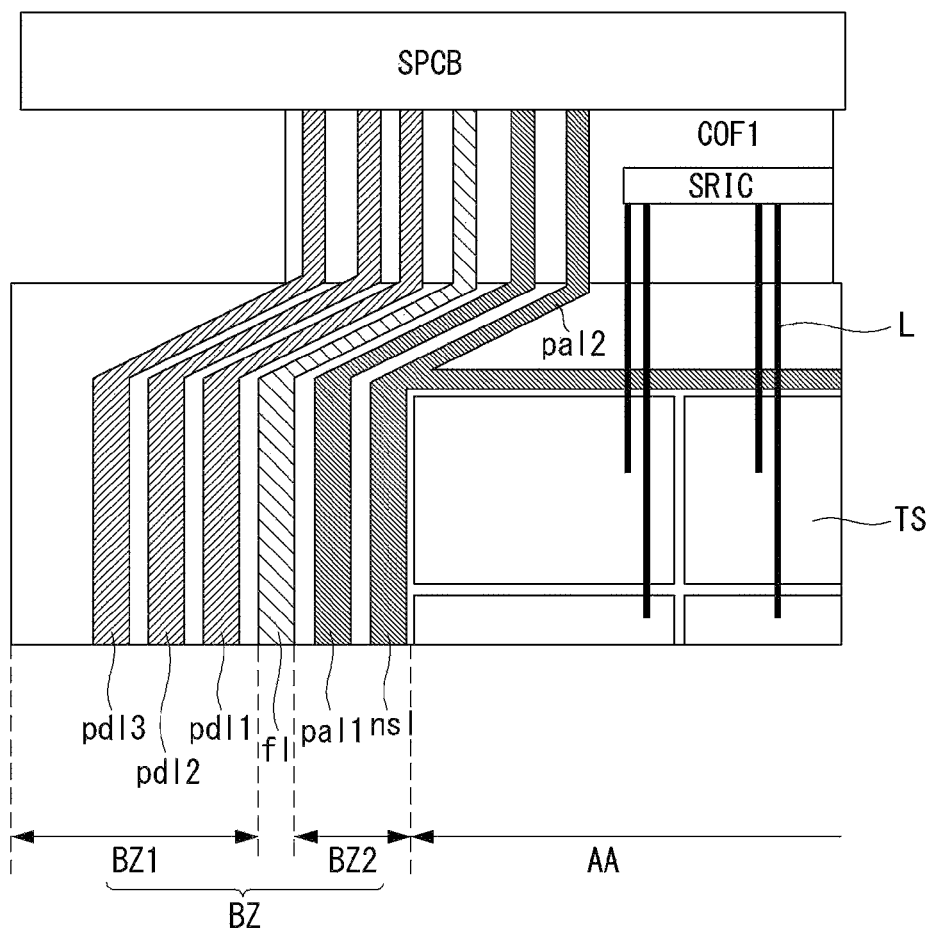
FIG. 9 illustrates another connection relationship of power lines in a bezel area according to an exemplary embodiment of the invention.
Figure 10:
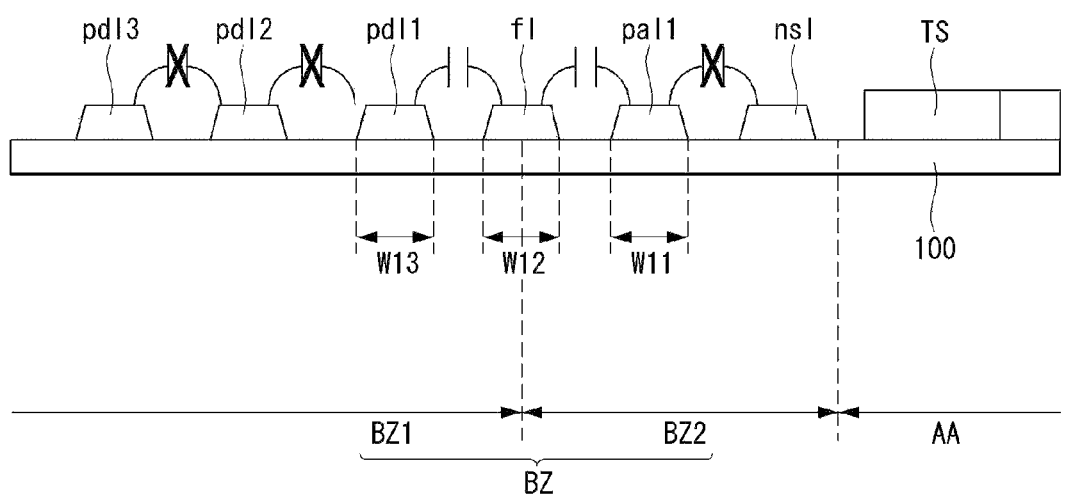
FIG. 10 is a cross-sectional view of power lines disposed in a bezel area illustrated in FIG. 9.

FIG. 9 illustrates another connection relationship of power lines in a bezel area according to the embodiment of the invention, and FIG. 10 is a cross-sectional view of the power lines in the bezel area illustrated in FIG. 9.

Referring to FIGS. 9 and 10, the display panel 10 according to the embodiment of the invention includes an active area AA and a bezel area BZ. Structures and components identical or equivalent to those illustrated in FIGS. 7 and 8 are designated with the same reference numerals in FIGS. 9 and 10, and a further description may be briefly made or may be entirely omitted.

The bezel area BZ includes a first bezel area BZ1, in which first power lines pdl1, pdl2, and pdl3 are disposed, and a second bezel area BZ2, in which a second power line pal1 is disposed. The second bezel area BZ2 is positioned between the first bezel area BZ1 and the active area AA. The second bezel area BZ2 is positioned closer to the active area AA than the first bezel area BZ1.

A floating line f1 is positioned between the first bezel area BZ1 and the second bezel area BZ2. The floating line f1 positioned between the first bezel area BZ1 and the second bezel area BZ2 can prevent a ripple of the DC power. When the AC signals Vdrv, LFD1, and LFD2 are supplied to the second power line pal1, the ripple resulting from the AC signals Vdrv, LFD1, and LFD2 may be generated in the floating line f1 coupled with the second power line pal1. The ripple generated in the floating line f1 may be generated in the first power lines pdl1, pdl2, and pdl3 coupled with the floating line f1. However, because one of both ends of the floating line f1 is connected to the ground voltage, the generated ripple is escaped through the ground voltage. Hence, the ripple disappears or is reduced. The first power lines pdl1, pdl2, and pdl3 coupled with the floating line f1 are scarcely affected by the ripple.

A mutual capacitance is produced between the floating line f1 and the first power lines pdl1, pdl2, and pdl3 and between the floating line f1 and the second power line pal1. However, because not the AC signals Vdrv, LFD1, and LFD2 but the Dc power is supplied to the first power lines pdl1, pdl2, and pdl3, the ripple of the DC power is not generated between the first power lines pdl1, pdl2, and pdl3. The floating line f1 positioned between the first bezel area BZ1 and the second bezel area BZ2 serves as a buffer between the first power lines pdl1, pdl2, and pdl3 and the second power line pal1 and thus can reduce the ripple generated by the AC signals Vdrv, LFD1, and LFD2 supplied to the second power line pal1. Hence, the floating line f1 can prevent the ripple from being generated in the first power lines pdl1, pdl2, and pdl3 adjacent to the second power line pal1.

A width W12 of the floating line f1 may be greater than a width W13 of the first power lines pdl1, pdl2, and pdl3 or a width W11 of the second power line pal1. As the width W12 of the floating line f1 increases, coupling between the first power lines pdl1, pdl2, and pdl3 and the second power line pal1 may be reduced, and thus a parasitic capacitance may be reduced. Hence, crosstalk resulting from the coupling can be prevented.

As described above, because the embodiment of the invention applies the touch driving signal Vdrv and the AC signals LFD1 and LFD2, having the same phase and the same amplitude, in which the ripple is removed, to both ends (the touch sensor and the signal lines) of the parasitic capacitance through the load free driving method, an influence of the parasitic capacitance may be excluded. This is because both ends (the touch sensor and the signal lines) of the parasitic capacitance, in which the ripple is removed, simultaneously change and an amount of charges charged to the parasitic capacitance decreases as a voltage difference between both ends decreases. According to the load free driving method, because an amount of charges charged to the parasitic capacitance is theoretically zero, a load free effect recognized as if there is no parasitic capacitance may be obtained.

Figure 11:
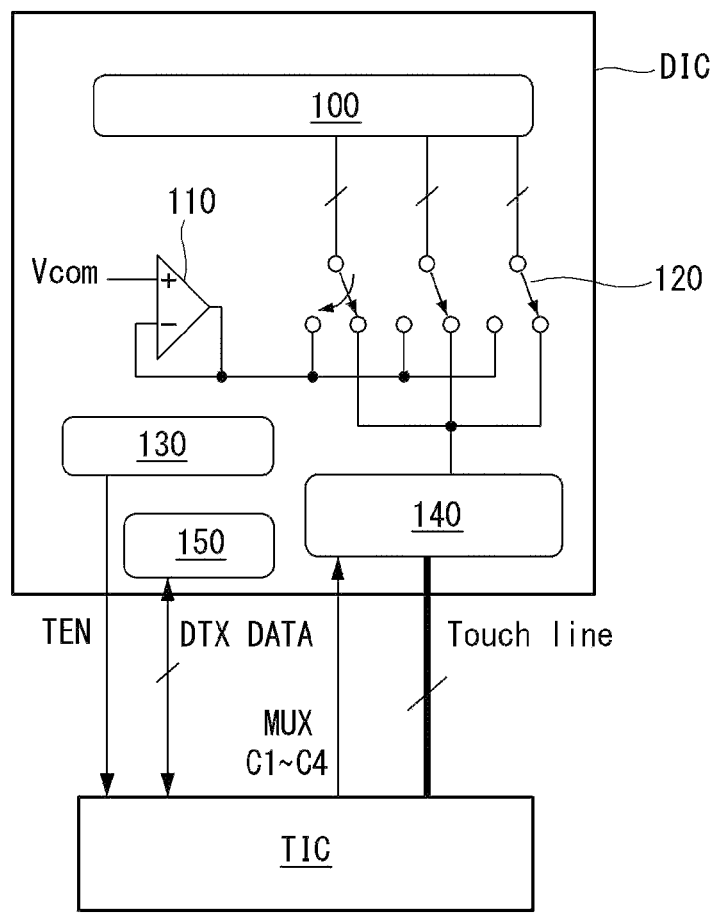
FIGS. 11 to 13 illustrate various examples of a touch driving device according to an exemplary embodiment of the invention.
Figure 12:
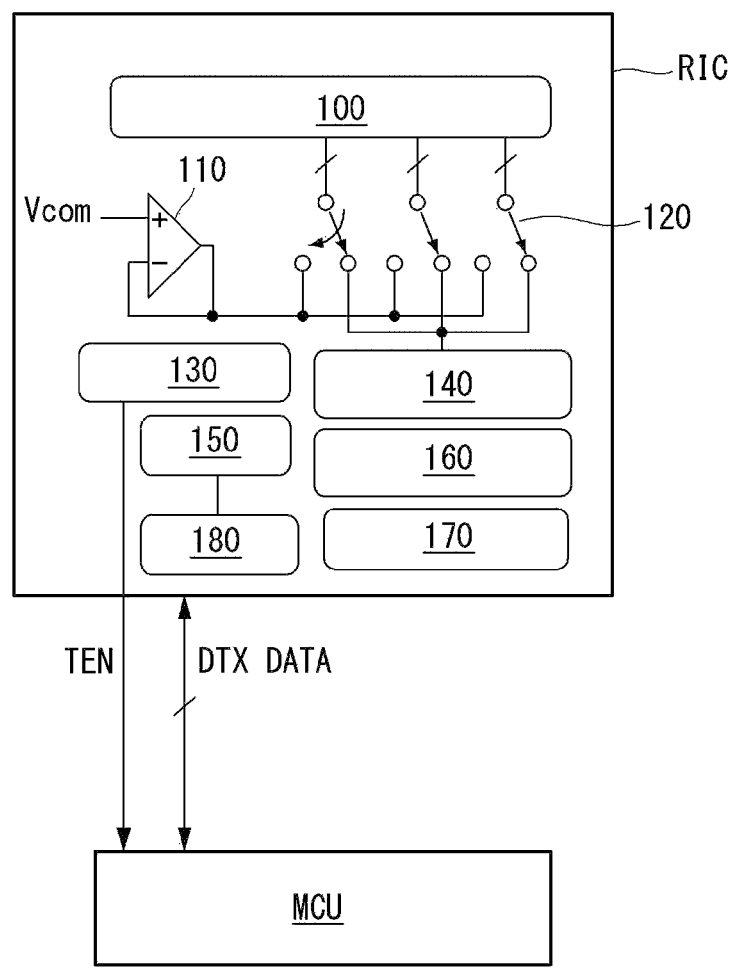
Figure 13:
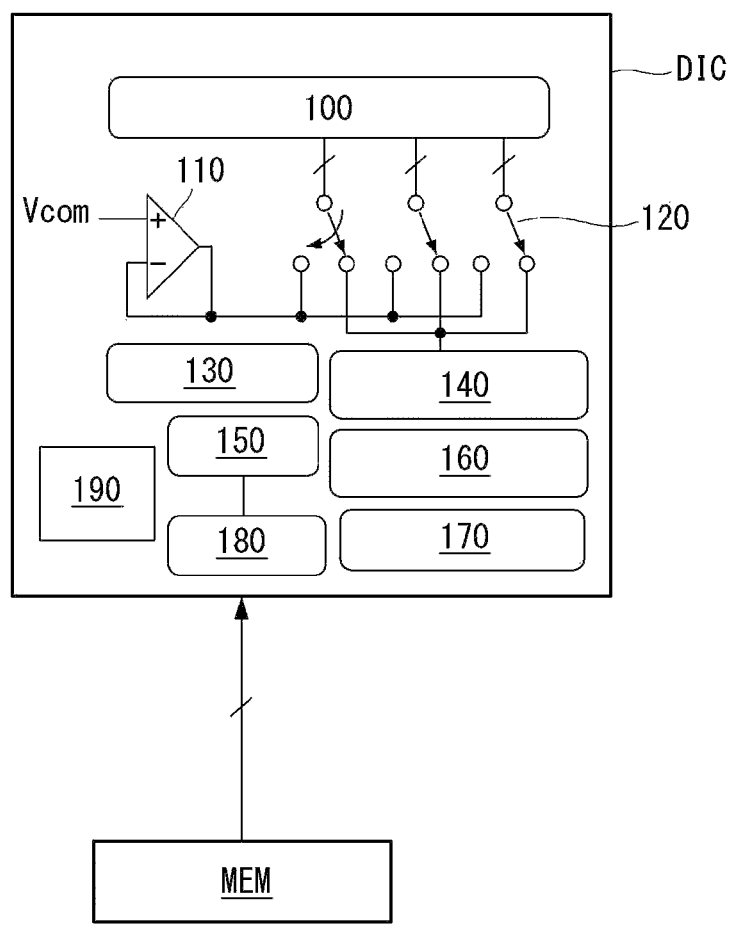

FIGS. 11 to 13 show various examples of the touch driving device 18 according to the embodiment of the invention.

The touch driving device 18 according to the embodiment of the invention may be implemented as an IC package illustrated in FIGS. 11 to 13.

Referring to FIG. 11, the touch driving device 18 includes a driver IC DIC and a touch sensing IC TIC.

The driver IC DIC includes a touch sensor channel circuit 100, a Vcom buffer 110, a switch array 120, a timing control signal generator 130, a multiplexer (MUX) 140, and a DTX compensation circuit 150.

The touch sensor channel circuit 100 is connected to electrodes of the touch sensors through the sensor lines and is connected to the Vcom buffer 110 and the multiplexer 140 through the switch array 120. The multiplexer 140 connects the sensor lines to the touch sensing IC TIC. In case of a 1-to-3 multiplexer, the multiplexer 140 sequentially connects one channel of the touch sensing IC TIC to the three sensor lines in the time-division manner and thus reduces the number of channels of the touch sensing IC TIC. The multiplexer 140 sequentially selects the sensor lines, which will be connected to the channel of the touch sensing IC TIC, in response to MUX control signals MUXC1 to MUXC3. The multiplexer 140 is connected to the channels of the touch sensing IC TIC through touch lines.

The Vcom buffer 110 outputs the common voltage Vcom of the pixel. The switch array 120 supplies the common voltage Vcom output from the Vcom buffer 110 to the touch sensor channel circuit 100 during the display driving period under the control of the timing control signal generator 130. The switch array 120 connects the sensor lines to the touch sensing IC TIC during the touch sensor driving period under the control of the timing control signal generator 130.

The timing control signal generator 130 generates timing control signals for controlling operation timings of the display driver and the touch sensing IC TIC. The display driver includes a data driver 12 for applying data of an input image to the pixels and a gate driver 14. The data driver 12 generates a data voltage and supplies the data voltage to data lines D1 to Dm of the display panel 10. The data driver 12 may be integrated into the driver IC DIC. The gate driver 14 sequentially supplies a gate pulse (or a scan pulse) synchronized with the data voltage to gate lines G1 to Gn of the display panel 10. The gate driver 14 may be on a substrate of the display panel 10 along with the pixels.

The timing control signal generator 130 of the driver IC DIC is substantially the same as a timing control signal generator present in the timing controller TCON 16 illustrated in FIG. 1. The timing control signal generator 130 drives the display driver during the display driving period and drives the touch sensing IC TIC during the touch sensor driving period.

The timing control signal generator 130, as illustrated in FIG. 3, produces the touch enable signal TEN defining the display driving period Td and the touch sensor driving period Tt and synchronizes the display driver with the touch sensing IC TIC. The display driver applies data to the pixels during a first level period of the touch enable signal TEN. The touch sensing IC TIC drives the touch sensors in response to a second level of the touch enable signal TEN and senses the touch input. A first level of the touch enable signal TEN may be a high level, and the second level of the touch enable signal TEN may be a low level, or vice versa.

The touch sensing IC TIC is connected to a driving power circuit (not shown) and receives driving power. The touch sensing IC TIC produces the touch sensor driving signal in response to the second level of the touch enable signal TEN and applies the touch sensor driving signal to the touch sensors. The touch sensor driving signal may be generated in various pulse shapes including a square wave, a sine wave, a triangle wave, etc. However, it is preferable, but not required, that the touch sensor driving signal is generated in the pulse shape of the square wave. The touch sensor driving signal may be applied to each of the touch sensors N times, so that charges are accumulated on an integrator of the touch sensing IC TIC N or more times, where N is a natural number equal to or greater than 2.

A noise of the touch sensor driving signal may increase depending on changes in data of the input image. The DTX compensation circuit 150 analyzes the data of the input image, removes a noise component from touch raw data depending on changes in a gray level of the input image, and transmits it to the touch sensing IC TIC. DTX means Display and Touch crosstalk. The content related to the DTX compensation circuit 150 is disclosed in detail in Korean Patent Application No. 10-2012-0149028 (Dec. 19, 2012) corresponding to the present applicant, and which is hereby incorporated by reference in its entirety. In case of a system, in which a noise of the touch sensor does not sensitively change depending on changes in data of the input image, the DTX compensation circuit 150 is not necessary, and thus, may be omitted.

The touch sensing IC TIC drives the multiplexer 140 in response to the touch enable signal TEN from the timing control signal generator 130 during the touch sensor driving period Tt and receives charges of the touch sensors through the multiplexer 140 and the sensor lines.

The touch sensing IC TIC detects a change in charges before and after the touch input from the touch sensor driving signal and compares the change in charges with a predetermined threshold value. The touch sensing IC TIC determines a location of the touch sensors having the change in charges, which is equal to or greater than the threshold value, as an area of the touch input. The touch sensing IC TIC calculates coordinates of each touch input and transmits touch data TDATA(XY) including coordinate information of the touch input to the external host system 19. The touch sensing IC TIC includes an amplifier amplifying charges of the touch sensor, an integrator accumulating charges received from the touch sensor, an analog-to-digital converter (ADC) converting a voltage of the integrator into digital data, and an arithmetic logic circuit. The arithmetic logic circuit compares touch raw data output from the ADC with the threshold value and determines the touch input based on the result of a comparison. The arithmetic logic circuit performs a touch recognition algorithm calculating coordinates.

The driver IC DIC and the touch sensing IC TIC may transmit and receive signals through a serial peripheral interface SPI.

The host system 19 means a system main body of an electronic device, to which the display device according to the embodiment of the invention is applicable. The host system 19 may be implemented as one of a phone system, a television system, a set-top box, a navigation system, a DVD player, a Blu-ray player, a personal computer PC, and a home theater system. The host system 19 receives touch input data TDATA(XY) from the touch sensing IC TIC and executes an application associated with the touch input.

Referring to FIG. 12, the touch driving device 18 includes a touch sensor driver RIC DIC and a microcontroller unit (MCU).

The touch sensor driver RIC includes a touch sensor channel circuit 100, a Vcom buffer 110, a switch array 120, a first timing control signal generator 130, a multiplexer (MUX) 140, a DTX compensation circuit 150, a sensing circuit 160, a second timing control signal generator 170, and a memory 180. The touch sensor driver RIC illustrated in FIG. 12 is different from the driver IC DIC shown in FIG. 11 in that the sensing circuit 160 and the second timing control signal generator 170 are integrated inside the touch sensor driver RIC. The first timing control signal generator 130 of FIG. 12 is substantially the same as the timing control signal generator 130 of FIG. 11. Thus, the first timing control signal generator 130 generates timing control signals for controlling operation timings of the display driver and the touch sensing IC TIC.

The multiplexer 140 floats electrodes of the touch sensor accessed by the sensing circuit 160 under the control of the MCU. The touch sensor electrodes accessed by the sensing circuit 160 are selected by the sensing circuit 160 among other touch sensor electrodes except the touch sensor electrodes connected to the pixels charged to the data voltage. The multiplexer 140 may supply the common voltage Vcom under the control of the MCU.

The sensing circuit 160 is connected to the sensor lines 115 through the multiplexer 140. The sensing circuit 160 measures a change in a waveform of the voltage received from the touch sensor electrodes 22 and converts the change into digital data. The sensing circuit 160 includes an amplifier amplifying the received voltages of the touch sensor electrodes 22, an integrator accumulating the amplified voltages of the amplifier, and an analog-to-digital converter (ADC) converting a voltage of the integrator into digital data. The digital data output from the ADC is touch raw data TDATA and is transmitted to the MCU.

The second timing control signal generator 170 generates timing control signals and clocks for controlling operation timings of the multiplexer 140 and the sensing circuit 160. The DTX compensation circuit 150 may be omitted in the touch sensor driver RIC. The memory 180 temporarily stores the touch raw data TDATA under the control of the second timing control signal generator 170.

The touch sensor driver RIC and the MCU may transmit and receive signals through a serial peripheral interface SPI. The MCU compares the touch raw data TDATA with a predetermined threshold value and determines a touch input based on the result of a comparison. The MCU performs a touch recognition algorithm calculating coordinates.

Referring to FIG. 13, the touch driving device 18 includes a driver IC DIC and a memory MEM.

The driver IC DIC includes a touch sensor channel circuit 100, a Vcom buffer 110, a switch array 120, a first timing control signal generator 130, a multiplexer 140, a DTX compensation circuit 150, a sensing circuit 160, a second timing control signal generator 170, a memory 180, and a MCU 190. The driver IC DIC illustrated in FIG. 13 is different from the touch sensor driver RIC illustrated in FIG. 12 in that the MCU 190 is integrated inside the driver IC DIC. The MCU 190 compares touch raw data TDATA with a predetermined threshold value and determines a touch input based on the result of a comparison. The MCU 190 performs a touch recognition algorithm calculating coordinates.

The memory MEM stores a register setting value related to timing information required in operations of the display driver and the sensing circuit 160. When the display device 10 is powered on, the register setting value is loaded from the memory MEM to the first timing control signal generator 130 and the second timing control signal generator 170. The first timing control signal generator 130 and the second timing control signal generator 170 generate timing control signals for controlling the display driver and the sensing circuit 160 based on the register setting value read from the memory MEM. The embodiment of the invention can respond to changes in a model of a driving device without change in a structure of the driving device by changing the register setting value of the memory MEM.

As described above, the embodiment of the invention can prevent crosstalk resulting from the coupling between the first and second power lines by separating the first power lines receiving the DC power from the second power lines receiving the AC power. As a result, the load free effect can increase.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel including an active area, in which pixels for displaying an input image and touch sensors for sensing a touch input are located, and a bezel area outside the active area; and
a power integrated circuit (IC) to produce DC (direct current) power and AC (alternating current) power and supply the DC power and the AC power to a plurality of power lines in the bezel area,
wherein the plurality of power lines include a first power line, to which the DC power is supplied, and a second power line, to which the AC power is supplied,
wherein the bezel area includes a first bezel area, in which the first power line is located, and a second bezel area, in which the second power line is located,
wherein the second bezel area is between the first bezel area and the active area, the second bezel area comprises a noise blocking line surrounding the active area.

2. The display device of claim 1, wherein a floating line is between the first bezel area and the second bezel area.

3. The display device of claim 1, wherein during a touch sensor driving period, in which the touch input is sensed, a touch driving signal is supplied to the touch sensors, a first AC signal having the same phase and the same amplitude as the touch driving signal is supplied to data lines connected to the pixels, and a second AC signal having the same phase and the same amplitude as the touch driving signal is supplied to gate lines connected to the pixels, and
wherein one of the touch driving signal, the first AC signal, and the second AC signal is supplied to the second power line.

4. The display device of claim 1, wherein during a touch sensor driving period, in which the touch input is sensed, a touch driving signal is supplied to the touch sensors, a first AC signal having the same phase and the same amplitude as the touch driving signal is supplied to data lines connected to the pixels, and a second AC signal having the same phase and the same amplitude as the touch driving signal is supplied to gate lines connected to the pixels, and
wherein one of the touch driving signal, the first AC signal, and the second AC signal is supplied to the noise blocking line.

5. The display device of claim 1, wherein a width of the noise blocking line is greater than a width of the first power line or a width of the second power line.

6. The display device of claim 1, wherein a floating line is between the first bezel area and the second bezel area.

7. The display device of claim 2, wherein a width of the floating line is greater than a width of the first power line or a width of the second power line.

* * * * *